Figure 1:
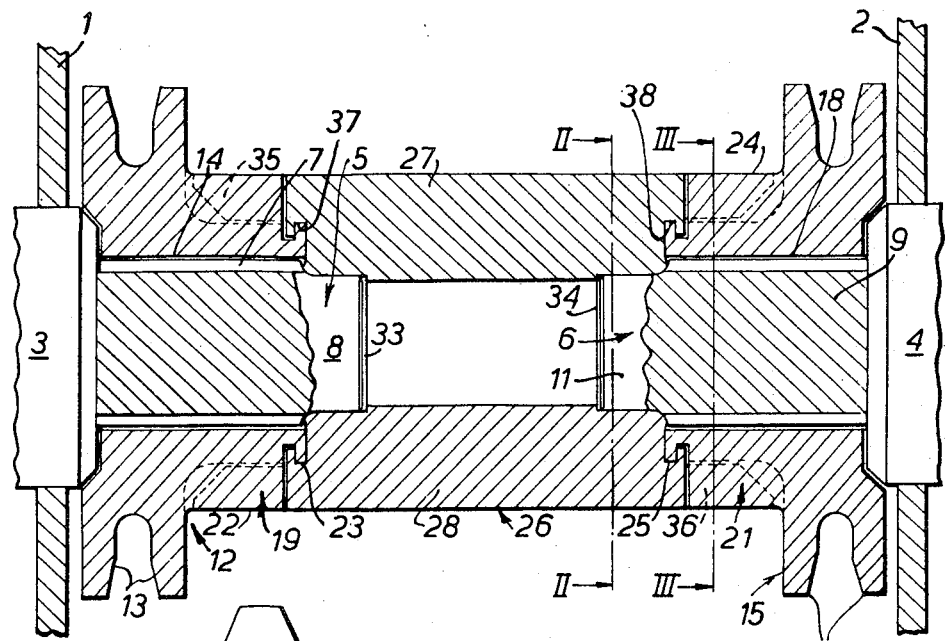

United States Patent
Dawson

[15] 3,685,367
[45] Aug. 22, 1972

[54] CHAIN CONVEYOR DRIVE SPROCKET ASSEMBLIES

[72] Inventor: Gordon Bertram Dawson, Worcester, England

[73] Assignee: Dowty Meco Limited, Worcester, England

[22] Filed: Nov. 24, 1970

[21] Appl. No.: 92,458

[30] Foreign Application Priority Data
Dec. 13, 1969  Great Britain..........60,897/69

[52] U.S. Cl..............................74/243 C, 287/52.05
[51] Int. Cl........F16h 55/30, B60b 27/06, F16d 1/06
[58] Field of Search......74/243 C, 243 R; 287/52.05, 287/52 R

[56] References Cited
UNITED STATES PATENTS 3,213,703  10/1965  Fitzgerald............74/243 R X
1,790,297  1/1931  Alger...................74/243 C X

FOREIGN PATENTS OR APPLICATIONS 898,165  6/1962  Great Britain..........74/243 C
964,498  5/1957  Germany................74/243 R
845,714  8/1960  Great Britain..........74/243 R

*Primary Examiner*—Leonard H. Gerin
*Attorney*—Young & Thompson

[57] ABSTRACT

A drive sprocket assembly for use in a chain conveyor having a pair of sprocket rings for mounting on a pair of spaced coaxial stub shafts. At least one sprocket ring has internal spline or key means so that it makes driving engagement with its associated stub shaft. A spacer member, having dogs or the like to engage both sprocket rings is located between both rings.

8 Claims, 3 Drawing Figures

PATENTED AUG 22 1972  3,685,367

INVENTOR
GORDON BERTRAM DAWSON
BY Young + Thompson
ATTORNEYS

3,685,367

CHAIN CONVEYOR DRIVE SPROCKET ASSEMBLIES

This invention relates to chain conveyor drive sprocket assemblies. Such sprocket assemblies are normally used in a chain conveyor of the armoured flexible type which is used to convey mineral material such as coal. The invention is concerned particularly with a drive sprocket assembly having two spaced sets of sprocket teeth adapted to engage and drive two spaced conveyor chains of the conveyor. Considerable quantities of material being conveyed are trapped between the chain and the sprocket teeth causing heavy wear on the sprocket assembly and it is desirable to so construct the sprocket assembly that it may be easily removed from the conveyor and substituted by another sprocket assembly. It is conventional for such a drive sprocket assembly to be formed in two parts which are joined together in a plane which includes the rotation axis, screw-threaded bolts holding the two parts together. Such a sprocket assembly is conventionally mounted on two spaced coaxial stub shafts which include lugs or splines to transmit driving torque to the sprocket assembly. The stub shafts are carried in bearings in the two sides of the conveyor structure and one or both of the shafts may be provided with driving means to transmit driving torque to the sprocket assembly. The joint action of driving torque and chain tension on such a sprocket assembly subjects the screw-threaded bolts to intermittently heavy tension loads and it is not uncommon for these bolts to break.

In accordance with the present invention a drive sprocket assembly for use in a chain conveyor having two spaced chains and intended to be mounted on a pair of spaced coaxial stub shafts comprises, a pair of sprocket rings for mounting one on each stub shaft, each being of one piece construction and having a set of chain engaging teeth, internal spline or key means formed on at least one sprocket ring to make driving engagement with its stub shaft, and a spacer member including dogs or the like to engage both sprocket rings to ensure like rotation of both sprocket rings about the stub shaft axis.

The spacer member may be capable of being clamped to the adjacent end portions of the coaxial stub shafts.

The spacer member may be formed in two pieces joinable together in a plane which includes the rotation axis for example by means of screw-threaded bolts. The action of joining the two pieces together, may also clamp the two pieces to the stub shafts. The spacer member may include further dogs or the like to engage the two sprocket rings to maintain them at a fixed spacing.

Where the spacer member is formed in two parts the associated chain conveyor is preferably so arranged that the pair of spaced coaxial stub shafts have a spacing between their adjacent ends sufficient to allow either sprocket ring to pass between them during entry into or removal from its operative position.

Figure 2:
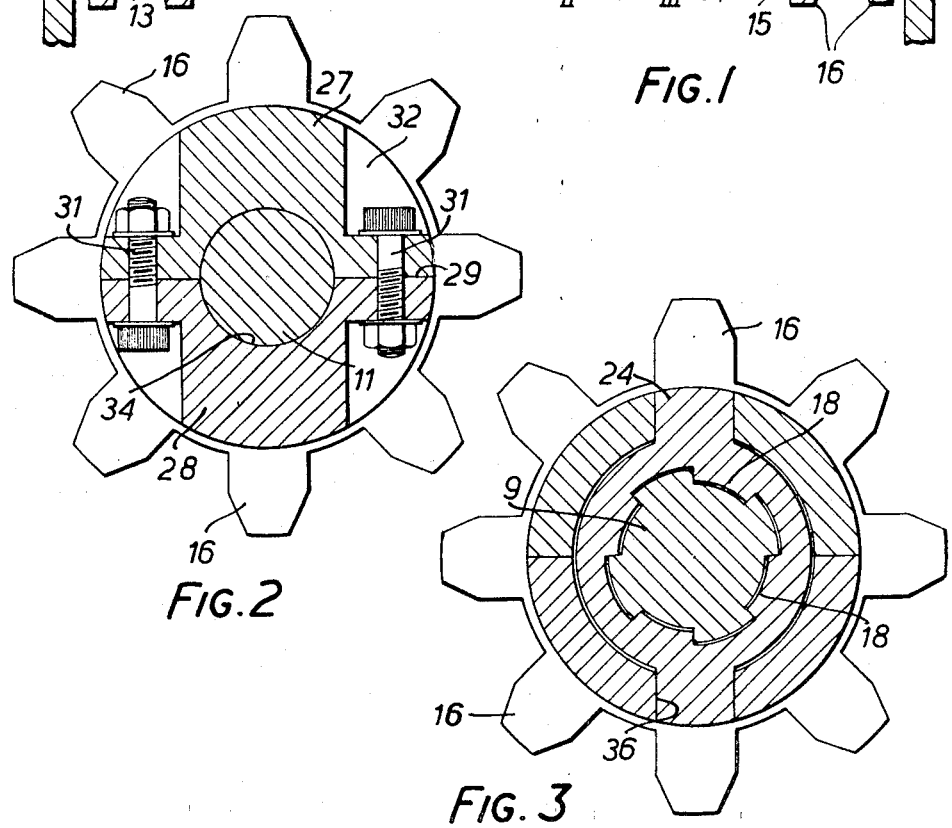
Figure 3:
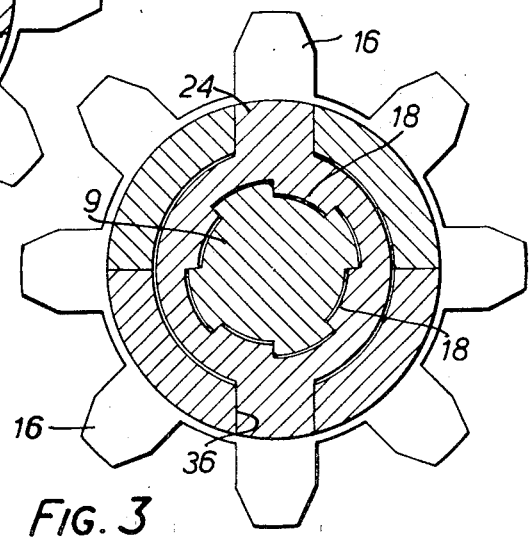

One embodiment of the invention will now be described with reference to the accompanying drawings, in which FIG. 1 is a longitudinal cross-section through the sprocket assembly, and FIGS. 2 and 3 respectively are cross-sections taken on the lines II—II and III—III of FIG. 1.

The conveyor using the illustrated sprocket assembly is an armoured flexible conveyor intended for use in a coal mine in which a pair of spaced chains extend along a plurality of pans flexibly connected to one another in end to end arrangement, the chains carrying scraper bars between them which engage and carry coal along the line of pans. The chains are arranged in endless loops which extend above the pans to effect the conveying action and return underneath the pans. At the position of the drive sprocket assembly the conveyor structure includes a pair of side members 1 and 2 which carry bearing housings 3 and 4 respectively for a pair of stub shafts 5 and 6. Either one or both of the stub shafts may be provided with motor and gear box means so that rotary drive may be exerted on it. The bearing housings 3 and 4 are carefully mounted in the side members 1 and 2 to ensure that the two stub shafts are co-axial. The stub shaft 5 includes a splined portion 7 and an end portion 8 which is unsplined. The stub shaft 6 includes a splined portion 9 and an end portion 11 which is unsplined. The splined portion 7 carries a one piece sprocket ring 12 having conventional chain engaging teeth 13. Internally the ring 12 includes splines 14 to engage the splined portion 7. Similarly the splined portion 9 carries a one piece sprocket ring 15 having conventional chain engaging teeth 16 and being internally splined at 18 to fit the splined portion 9.

The sprocket rings 12 and 15 include bosses respectively 19 and 21 extending towards one another.

The boss 19 is formed with two diametrically opposite dogs 22 and at its inner end with a radially projecting flange 23. The boss 21 is similarly formed with two diametrically opposite dogs 24 and at its inner end with a radially projecting flange 25.

The spacer member 26 is in the form of a drum extending between the two sprocket rings 12 and 15. The drum 26 is formed in two parts 27 and 28 which join together in a plane 29 which includes the rotation axis of the two stub shafts. A number of screw-threaded bolts 31 extend between the two parts 27 and 28 to hold them tightly together, the heads of the bolts being conveniently located in recesses 32 in the two parts. The drum 26 is provided with two internal bores 33 and 34 capable of tight engagement on the end portions 8 and 11 of the two stub shafts, the clamping together of the two parts 27 and 28 by bolts 31 ensuring very tight clamping of the stub shafts by the drum 26.

The drum 26 at one end includes two slots 35 to engage in the dogs 22 and the other end two slots 36 to engage the dogs 24 of sprocket ring 15. The drum 26 is also provided with a pair of internally formed grooves 37 and 38 to engage on the flanges 23 and 25 of sprockets 12 and 15.

In order to fit the drive sprocket assembly on to the stub shafts, the two sprocket rings 12 and 15 are initially passed through the space between the two stub shafts and moved axially on to the splined portions of their respective stub shafts. The two parts 27 and 28 are then fitted into position so that the slots 35 and 36 thereof engage in the dogs 22 and 24 of the sprocket rings and the grooves 37 and 38 fit over the flanges 23 and 25 of the sprocket rings. The insertion and tightening down of the screws 31 will clamp the two parts 27 and 28 on to the stub shaft end portions 8 and 11. In operation rotary drive is supplied by one or both stub shafts 5 and 6 and the drum 26 will grip the two sprocket rings to ensure that they rotate together at exactly the same speed so that the two chains of the conveyor are moved at exactly the same speed. The tension developed in the two chains is reacted on the driving sprocket assembly purely as a torque transmitted through the splined portions of the stub shafts and/or through the engaging dogs between the drum 26 and the sprocket rings. The bearing housings 3 and 4 for the stub shafts will react the actual thrust of the chain. Bending moment exerted by the chains on the sprocket assembly is reduced to a minimum by the clamping action of the drum 26 on the stub axles and the close location of the sprocket rings to the bearing housings. Since the drum 26 operates principally in torsion and since the sprocket rings are each formed in one piece it is difficult for the driving torque and chain tension to place excessive tension loads on the securing bolts 31.

Whilst in the described embodiment the drum 26 is formed in two parts it is within the scope of the present invention for the drum 26 to be formed as one piece. However this would necessitate the removal of one stub shaft and its bearing housing in order to fit the sprocket assembly into its operating position. Also where the drum 26 is of one piece it would not be possible to arrange that the flanges 23 and 25 of the sprocket rings could engage in grooves in the drum 26. However the equivalent effect may be obtained by providing dogs insertable into the drum after the sprocket rings have been entered into position to engage the flanges 23 and 25. In the case of a one piece drum the bores 33 and 34 are accurately formed so as to be an interference fit on the end portions 8 and 11 of the stub shafts to provide the clamping effect.

I claim:

1. In a chain conveyor having a pair of spaced chains drivably engaging a drive sprocket assembly mounted on a pair of spaced co-axial stub shafts, an improved drive sprocket assembly comprising:
   a pair of sprocket rings for mounting one on each stub shaft,
   each sprocket ring being of one-piece construction and having a set of chain-engaging teeth,
   spline or key means provided in at least one sprocket ring for cooperation with spline or key means on the associated stub shaft for driving engagement therewith,
   a spacer member between the sprocket rings,
   engagement means acting between the spacer member and each sprocket ring to ensure rotation of the sprocket rings in unison about the stub shaft axis, and
   clamping means for clamping the spacer member to the adjacent end portions of the co-axial stub shafts.

2. A chain conveyor drive sprocket assembly according to claim 1, which includes cooperating flange and groove means on the spacer member and the sprocket rings to maintain the sprocket rings at a predetermined spacing.

3. In a chain conveyor having a pair of spaced chains drivably engaging a drive sprocket assembly mounted on a pair of spaced co-axial stub shafts, an improved drive sprocket assembly comprising:
   a pair of sprocket rings for mounting one on each stub shaft,
   each sprocket ring being of one-piece construction and having a set of chain-engaging teeth,
   spline or key means provided in at least one sprocket ring for cooperation with spline or key means on the associated strub shaft for driving engagement therewith,
   a spacer member between the sprocket rings,
   said spacer member being formed in two parts which are joined together in a plane which includes the common axis of the stub shafts, and
   engagement means acting between the spacer member and each sprocket ring to ensure rotation of the sprocket rings in unison about said axis.

4. A chain conveyor drive sprocket assembly according to claim 3, wherein the two parts of the spacer member are joined together by bolts.

5. A chain conveyor drive sprocket assembly according to claim 3, wherein each of said parts includes groove means arranged to receive flange means of each sprocket ring to maintain the sprocket rings at a predetermined spacing.

6. A chain conveyor drive sprocket assembly according to claim 3, wherein the dimensions of the sprocket rings and the axial spacing between the adjacent ends of the stub shafts are such as to permit passage of the sprocket rings between said stub shaft ends during movement thereof into or out of their operative positions.

7. In a chain conveyor having a pair of spaced chains drivably engaging a drive sprocket assembly mounted on a pair of spaced co-axial stub shafts, an improved drive sprocket assembly comprising:
   a pair of sprocket rings for mounting one on each stub shaft,
   each sprocket ring being of one-piece construction and having a set of chain-engaging teeth,
   spline or key means provided in at least one sprocket ring for cooperation with spline or key means on the associated stub shaft for driving engagement therewith,
   a spacer member between the sprocket rings,
   first engagement means acting between the spacer member and each sprocket ring to ensure rotation of the sprocket rings in unison about the stub shaft axis, and
   second engagement means acting between the spacer and each sprocket ring to hold the sprocket rings at a fixed relative spacing.

8. A chain conveyor drive sprocket assembly according to claim 7, wherein said first engagement means comprises dog coupling means, said second engagement means comprises flange and groove means and clamping means are provided clamping the spacer member to the adjacent end portions of the stub shafts.

* * * * *